(12) United States Patent
Casey

(10) Patent No.: US 7,707,489 B2
(45) Date of Patent: Apr. 27, 2010

(54) APPARATUS AND METHOD FOR VISUALIZING OVERLAPPING RANGE-BANDS

(75) Inventor: Andrew Michael Casey, Unionville (CA)

(73) Assignee: Business Objects Software, Ltd., Dublin (IE)

( * ) Notice: Subject to any disclaimer, the term of this patent is extended or adjusted under 35 U.S.C. 154(b) by 866 days.

(21) Appl. No.: 11/525,264

(22) Filed: Sep. 22, 2006

(65) Prior Publication Data

US 2008/0126924 A1    May 29, 2008

(51) Int. Cl.
G06F 17/00    (2006.01)
(52) U.S. Cl. ..................................... 715/227
(58) Field of Classification Search ............... 715/212, 715/213, 220, 217, 218
See application file for complete search history.

(56) References Cited

U.S. PATENT DOCUMENTS

| | | | | |
|---|---|---|---|---|
| 5,790,529 A | * | 8/1998 | Haber | ........................ 370/536 |
| 5,999,193 A | * | 12/1999 | Conley et al. | ................ 345/440 |
| 6,351,280 B1 | * | 2/2002 | Benton | ......................... 348/51 |
| 6,632,093 B1 | * | 10/2003 | Rice et al. | ...................... 434/98 |
| 7,516,114 B2 | * | 4/2009 | Dieberger et al. | .............. 707/1 |
| 2003/0151611 A1 | * | 8/2003 | Turpin et al. | ................. 345/589 |
| 2004/0170299 A1 | * | 9/2004 | Macy et al. | .................. 382/100 |
| 2005/0109834 A1 | * | 5/2005 | Grindel et al. | ............... 235/379 |
| 2005/0120297 A1 | * | 6/2005 | Taboada et al. | .............. 715/510 |
| 2006/0026498 A1 | * | 2/2006 | Hays et al. | ................... 715/503 |
| 2006/0129914 A1 | * | 6/2006 | Ellis et al. | .................... 715/504 |
| 2007/0008250 A1 | * | 1/2007 | Hoppenbrouwers et al. | ... 345/76 |
| 2007/0277090 A1 | * | 11/2007 | Raja et al. | .................... 715/503 |

OTHER PUBLICATIONS

Kelly et al., A Spreadsheet Interface for Visualization Exploration, ACM 2000, pp. 69-76.*

* cited by examiner

*Primary Examiner*—Cong-Lac Huynh
(74) *Attorney, Agent, or Firm*—Cooley Godward Kronish LLP

(57) ABSTRACT

A computer implemented method includes forming column range-bands, generating row range-bands, and establishing global range-bands in conjunction with the column range-bands and the row range-bands.

15 Claims, 6 Drawing Sheets

| Time | USA | CA | OR |
|---|---|---|---|
| 1997 | 102,278.409 | 29,607.299 | 20,194.001 |
| Q1 | 25,296.127 | 4,296.631 | 3,963.658 |
| January | 6,700.272 | 1,055.816 | 1,252.472 |
| February | 11,305.688 | 4,348.298 | 1,547.873 |
| March | 7,290.166 | 892.517 | 1,163.313 |
| Q2 | 24,066.825 | 7,688.571 | 3,897.526 |
| April | 8,377.308 | 2,689.773 | 1,334.107 |
| May | 7,474.314 | 4,318.054 | 1,200.445 |
| June | 8,215.204 | 4,680.745 | 1,362.974 |

APPARATUS AND METHOD FOR VISUALIZING OVERLAPPING RANGE-BANDS

BRIEF DESCRIPTION OF THE INVENTION

This invention relates generally to visualizing data. More particularly, this invention relates to a method of depicting the overlap of multiple visual indicators associated with range-bands.

BACKGROUND OF THE INVENTION

A user may quickly identify trends and values of concern in a table with a range-band. This approach is useful for a range-band formed in a single dimension. However, applying multiple dimensions of range-bands to the same cell is problematic. This problem may be solved by selecting a single default range-band to display. For example, row range-bands may be selected as the predominate range-bands, and therefore only row range-bands are displayed in a cell that also has column and/or global range-bands.

In view of the foregoing, it would be advantageous to provide a system that enables the effective simultaneous display of range-bands for row, column, and global values.

SUMMARY OF INVENTION

The invention includes a computer implemented method of forming column range-bands, generating row range-bands, and establishing global range-bands in conjunction with the column range-bands and the row range-bands.

The invention also includes a computer readable storage medium with executable instructions to apply a first range-band and form a second range-band. The first range-band and the second range-band intersect at a shared cell and both the first range-band and the second range-band are visible within the shared cell.

BRIEF DESCRIPTION OF THE FIGURES

The invention is more fully appreciated in connection with the following detailed description taken in conjunction with the accompanying drawings, in which:

FIG. 3 illustrates a table configured in accordance with an embodiment of the invention.

Like reference numerals refer to corresponding parts throughout the several views of the drawings.

DETAILED DESCRIPTION OF THE INVENTION

The invention is disclosed in connection with the following definitions.

Range-band is a set of quantitative values with an associated visual indicator (e.g., color, texture, shading, animation and the like). The set may be an interval, band, block or range. The visual indicator is typically applied to a cell background or to the text of a value.

Color-band is a specific form of a range-band. A color-band is a set of quantitative values associated with a color. Thus, each quantitative value has a corresponding color.

Column range-band is a column of data with a range-band.

Row range-band is a row of data with a range-band.

Global range-band is a table of data with a range-band.

A range-band visual indicator is the sensory indicia (e.g., color, texture, shading, animation and the like) applied to a set of data.

A line of symmetry is a line through a data cell which divides the cell into two equal portions.

Figure 1:
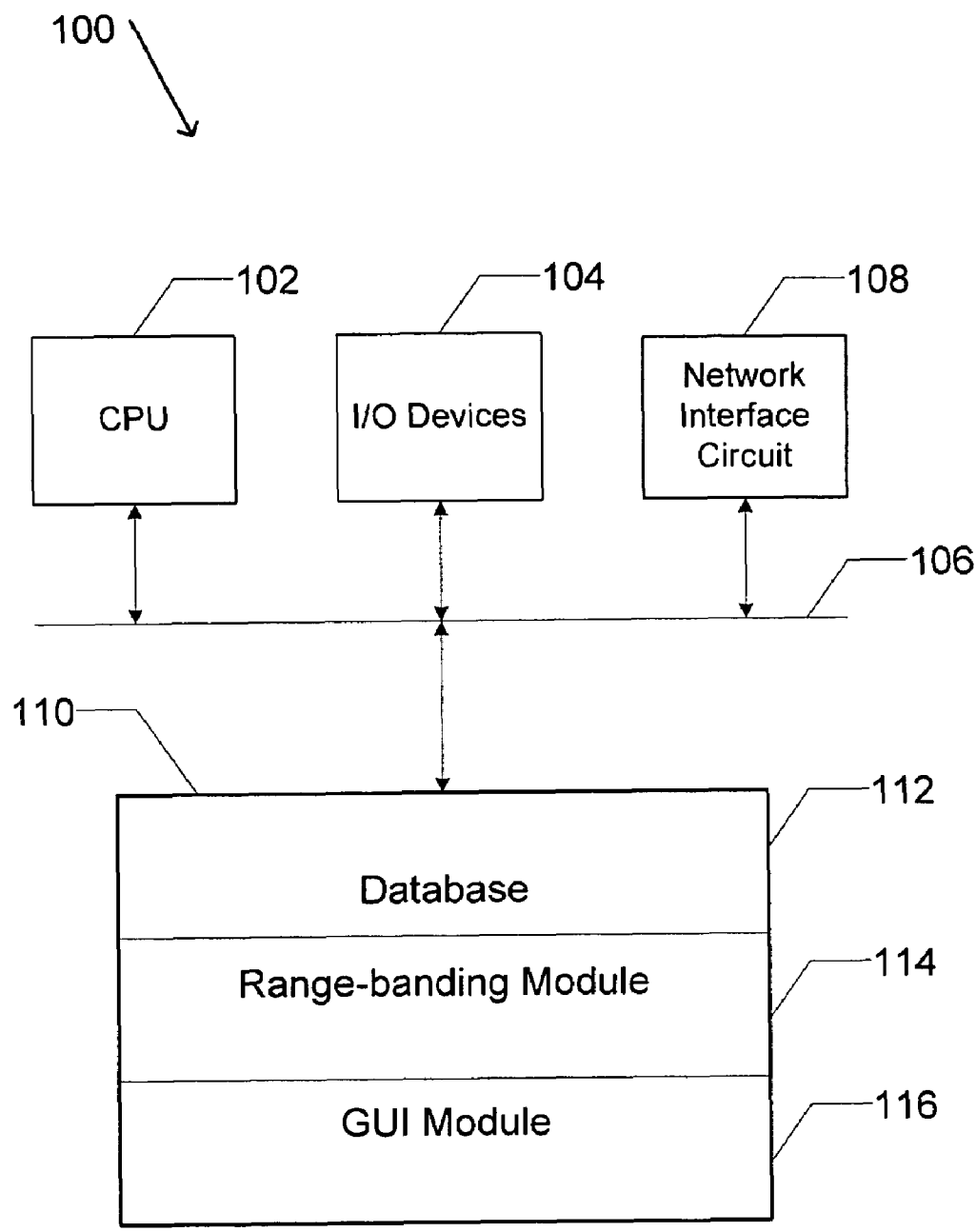
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. The memory 106 stores a set of executable programs to implement operations of the invention. One executable program is a range-banding module 114. The range-banding module 114 includes executable instructions to access a data source (e.g., a database 112, a data warehouse, and the like) to receive range-band specifications from the user, and to associate user specified range-bands to each data value. All applicable row, column and global range-bands associated with a data value are applied, rather than a single default range-band (e.g., only the row color) as in the prior art.

Memory 110 also stores a Graphical User Interface (GUI) module 116. The GUI module 116 displays the dataset in a table format (e.g., the table 300 of FIG. 3) and, once specified by the user, displays all indicia associated with a particular data value simultaneously, applying the appropriate range-band.

While the various components of memory 110 are shown residing in the single computer 100, it should be recognized that such a configuration is not required in all applications. For instance, the data source may reside in a separate computer (not shown in FIG. 1) that is connected to a network through the network interface circuit 108. Similarly, the range-band module 114 may reside in another computer (not shown in FIG. 1), separate from both the computer 100 and the computer storing the data source, which is also connected to a network. Additionally, separate modules of executable code are not required. The invention is directed toward the operations disclosed herein. There are any number of ways and locations to implement those operations, all of which should be considered within the scope of the invention.

Figure 2:
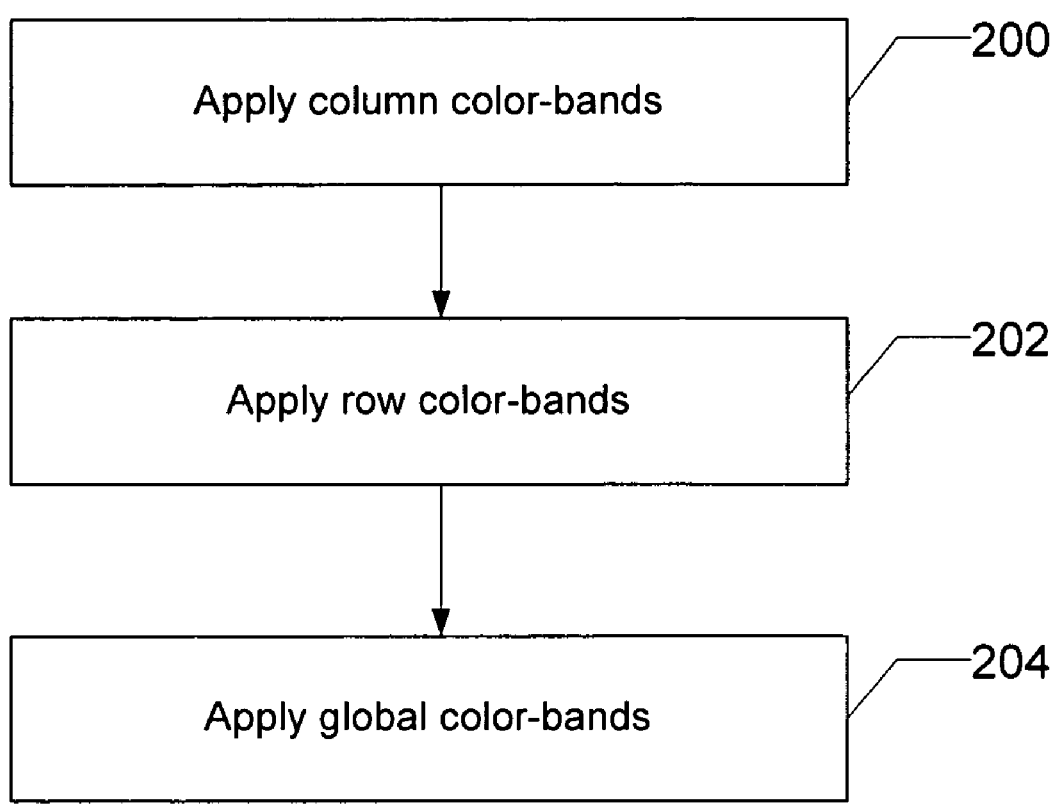
FIG. 2 illustrates processing operations associated with an embodiment of the invention.
Figure 4:
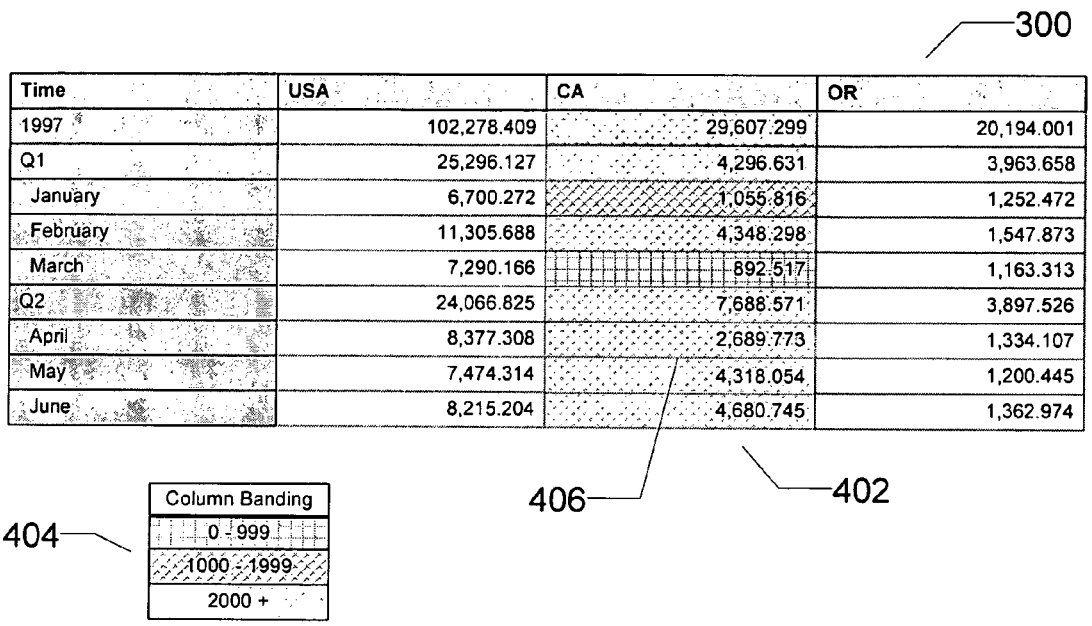
FIG. 4 illustrates column range-bands in the table of FIG. 3 according to an embodiment of the invention.

FIG. 2 illustrates the application of three types of range-bands to a table 300. The first processing operation shown in FIG. 2 is to apply column range-bands 200. In one embodiment, this is implemented with executable code of the range-banding module 114 and the result is displayed with the executable code of the GUI module 116. Either default values are provided or the user specifies the column range-band parameters indicating the column(s) to apply the range-bands to, the indicia to use and the data value range that each indicia applies to. The range-banding module 114 associates the appropriate indicia with each of the specified data values. The GUI module 116 displays the table 300 with column range-bands as illustrated in FIG. 4. The indicia for each cell in the specified column(s) (e.g., the column 402) corresponds to the range that the cell's data value falls into. The column range-bands are specified in the legend 404.

Figure 5:
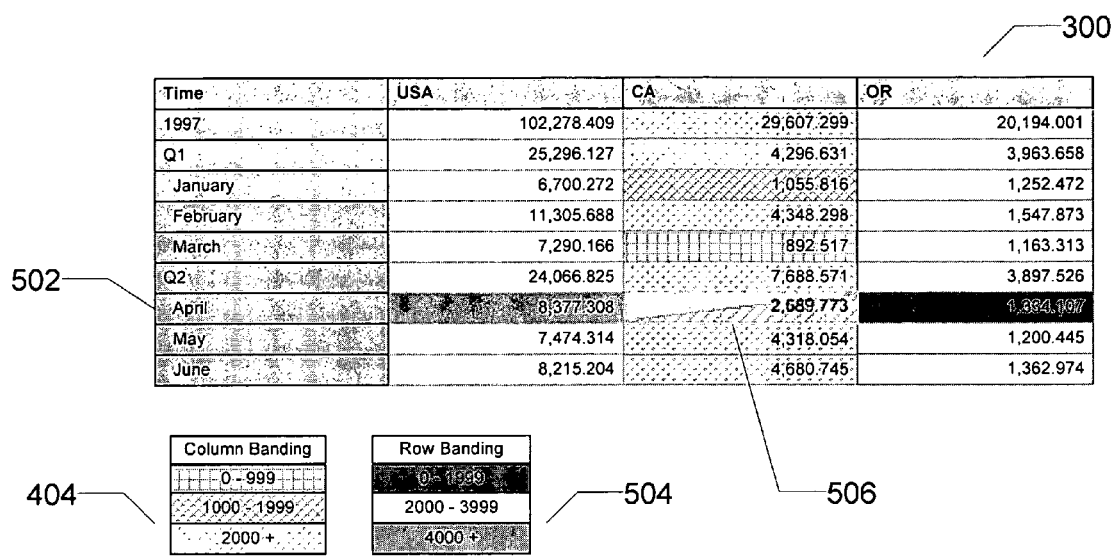
FIG. 5 illustrates combined column and row range-bands in the table of FIG. 3 according to an embodiment of the invention.

Returning to FIG. 2, the next operation is to supplement column range-bands with row range-bands 202. Either default values are provided or the user specifies the row range-band parameters indicating the row(s) to apply the range-bands to, the indicia set to use and the data value range that each indicia applies to. The range-banding module 114 associates the appropriate indicia with the specified data values. The GUI module 116 displays the table 300 with both column and row range-bands as illustrated in FIG. 5. The indicia of each cell in the specified row(s) (e.g., the row 502) corresponds to the range that the cell's data value falls into. The row range-band values are specified in the legend 504.

In the case where row and column range-bands overlap, the cell indicia is divided to display a portion in the row indicia and a portion in the column indicia. In one embodiment of the invention, the indicia is cross-hatching and grayscale divided to display half and half. For example, the cell 506 is divided diagonally. As specified by the legend 504, its row range-band upper half is a medium-light gray because its data value—2,689.773—falls in the range 2,000-3,999. As specified by the legend 404, its column range-band lower half has diagonal lines because its data value is greater than 2,000.

Figure 6:
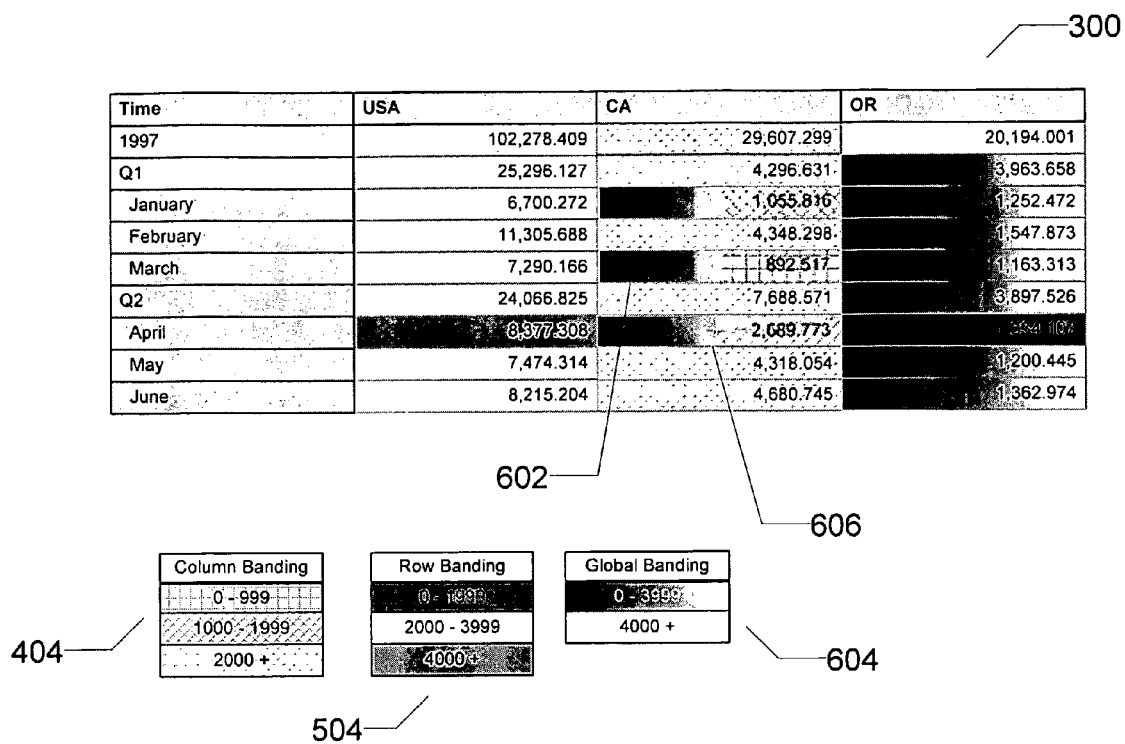
FIG. 6 illustrates combined column, row and global range-bands in the table of FIG. 3 according to an embodiment of the invention.

Returning to FIG. 2, the next operation is to supplement column and row range-bands with global range-bands 204. Either default values are provided or the user specifies the global range-band parameters indicating the indicia to use and the data value range that each indicia applies to. The range-banding module 114 associates the appropriate indicia with the specified data values. The GUI module 116 displays the table 300 with column, row and global range-bands as illustrated in FIG. 6. A gradient overlay (e.g., color, texture or animation) is applied to each cell in the table 300 using the indicia that corresponds to the range that the cell's data value falls into. The global range-band values are specified in the legend 604.

In the case where global range-bands overlap row or column range-bands, the cell indicia is set to the appropriate row or column range-band indicia and the global indicia is displayed as a gradient overlay. For example, the cell 602 has a cross-hatch pattern for its column band value and gray scale as a gradient overlay. As specified by the legend 404, the column range-band background is cross-hatched because its data value—892.517 is between 0-999. The global range-hand gradient overlay is black because the data value is in the range 0-3,999.

In the case where row, column and global range-bands overlap, the cell indicia is divided to display half the row indicia and half the column indicia with the global indicia displayed as a gradient overlay. For example, the cell 606 is divided diagonally with a gradient overlay. As specified by the legend 404, the column range-band lower half has diagonal lines because its data value—2,689.773—is greater than 2,000. As specified by the legend 504, the row range-band upper half is a light gray because its data value falls in the range 2,000-3,999. As specified by the legend 604, the global range-band gradient overlay is black because the data value is between 0-3,999.

Figure 7:
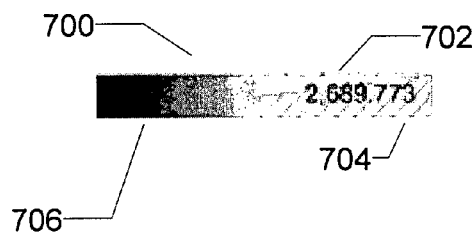
FIG. 7 illustrates a single cell displaying column, row and global range-bands simultaneously according to an embodiment of the invention.

Refer to the cell 700 of FIG. 7 for a clearer illustration of the multiple indicia associated with cell 606. Cell 700 of FIG. 7 is divided diagonally, the upper half 702 displays the row range-band indicia and the lower half 704 displaying the column range-band indicia. The end 706 displays the global range-band indicia in a gradient overlay. This is just one of many ways to segment the cell for multiple indicia. In further embodiments of the invention, the column indicia may appear in the top half of the cell and the row indicia in the bottom half, the global gradient overlay may fade from the center towards the ends instead of from the one end towards the center, the row, column and global indicia may all appear as equally divided segments of the cell background, and the like.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer implemented method, comprising:
   forming column range-bands;
   generating row range-bands, wherein a column range-band and a row range-band intersect at a shared data cell and wherein the shared data cell is split to display both the column range-band and the row range-band; and
   establishing global range-bands in conjunction with the column range-bands and the row range-bands.

2. The method of claim 1, wherein the global range-band includes a gradient overlay.

3. The method of claim 2, wherein the global range-band is displayed with an outer-edge to cell-center gradient overlay.

4. The method of claim 1, wherein a range-band has indicia selected from a color, a texture, a shading and an animation.

5. The method of claim 4, wherein textures are associated with different colors and are provided as default options in specific cases, selected from at least one of printing to gray scale printers and displaying on predetermined devices.

6. The method of claim 4, wherein a color set associated with a range-band ranges from light to dark in association with a set of value ranges.

7. The method of claim 1, wherein the column range-bands, the row range-bands and the global range-bands are distinguished from each other by using at least one of a contrasting color set, a contrasting texture set, a contrasting shading set or a contrasting animation set.

8. The method of claim 1, wherein the shared data cell is split on a line of symmetry displaying the column range-band in a first portion of the shared data cell and displaying the row range-band in a second portion of the shared data cell.

9. The method of claim 1, wherein the shared data cell is split diagonally from the top left corner to the bottom right corner displaying the column range-band in the upper portion of the cell and displaying the row range-band in the lower portion of the cell.

10. A computer readable storage medium, comprising executable instructions to:

apply a first range-band; and form a second range-band, wherein:

the first range-band and the second range-band intersect at a shared cell and both the first range-band and the second range-band are visible within the shared cell.

11. The computer readable storage medium of claim 10, wherein:

the first range-band is selected from a column range-band, a row range-band and a global range-band, and the second range-band is selected from a column range-band, a row range-band and a global range-band, but is a dissimilar type of range-band from the first range-band.

12. The computer readable storage medium of claim 10, further comprising executable instructions to apply a third range-band.

13. The computer readable storage medium of claim 12, wherein:

the shared cell is intersected by the third range-band and all range-bands are visible within the shared cell.

14. The computer readable storage medium of claim 12, wherein:

the third range-band is selected from a column range-band, a row range-band and a global range-band, and is a dissimilar type of range-band from the first range-band and the second range-band.

15. The computer readable storage medium of claim 10, wherein the first range-band and the second range-band are distinguished from each other by at least one of a contrasting color set, a contrasting texture set, a contrasting shading set and a contrasting animation set.

* * * * *